United States Patent
Pan et al.

(10) Patent No.: US 10,243,911 B2
(45) Date of Patent: Mar. 26, 2019

(54) SUGGESTED CONTENT FOR EMPLOYEE ACTIVATION

(71) Applicant: Microsoft Technology Licensing, LLC, Redmond, WA (US)

(72) Inventors: Wayne Pan, San Jose, CA (US); Nicholas David Snyder, Belmont, CA (US); William Jayang Sun, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 156 days.

(21) Appl. No.: 14/880,959

(22) Filed: Oct. 12, 2015

(65) Prior Publication Data

US 2016/0149851 A1 May 26, 2016

Related U.S. Application Data

(60) Provisional application No. 62/110,300, filed on Jan. 30, 2015, provisional application No. 62/083,847, filed on Nov. 24, 2014.

(51) Int. Cl.
| | |
|---|---|
| *H04L 12/58* | (2006.01) |
| *H04L 29/08* | (2006.01) |
| *H04W 4/21* | (2018.01) |
| *H04W 4/20* | (2018.01) |

(52) U.S. Cl.
CPC .......... *H04L 51/32* (2013.01); *H04L 67/306* (2013.01); *H04W 4/206* (2013.01); *H04W 4/21* (2018.02)

(58) Field of Classification Search
CPC ....................................................... H04L 51/32
See application file for complete search history.

(56) References Cited

U.S. PATENT DOCUMENTS

| | | | |
|---|---|---|---|
| 8,700,710 B1 * | 4/2014 | Gallagher | G06Q 50/01 709/204 |
| 9,247,015 B2 * | 1/2016 | Ruffner | G06F 17/30873 |
| 9,268,818 B1 | 2/2016 | Pattan et al. | |
| 9,307,380 B1 * | 4/2016 | Smith | H04W 4/21 |
| 9,361,322 B1 | 6/2016 | Dutta et al. | |
| 9,436,709 B1 | 9/2016 | Anima et al. | |
| 9,524,077 B1 | 12/2016 | Pattan et al. | |

(Continued)

OTHER PUBLICATIONS

"Examiner Initiated Interview Summary Issued in U.S. Appl. No. 14/880,917", dated Mar. 16, 2018, 3 Pages.

(Continued)

*Primary Examiner* — Lashonda T Jackson
(74) *Attorney, Agent, or Firm* — Schwegman Lundberg & Woessner, P.A.

(57) ABSTRACT

Techniques for identifying suggested online content for company administrators to broadcast to company employees via an online social networking service are described. According to various embodiments, a plurality of suggested content items are displayed, via an administrator user interface, to a user associated with a company. A user request is then received via the administrator user interface, the request being to broadcast a recommendation to view a specific content item of the suggested content items to one or more employees of the company that are members of an online social networking service. The recommendation to view the specific content item is then broadcast to the employees of the company.

17 Claims, 14 Drawing Sheets

(56) References Cited

U.S. PATENT DOCUMENTS

| | | | |
|---|---|---|---|
| 9,654,535 | B2 | 5/2017 | Nguyen et al. |
| 9,756,008 | B2* | 9/2017 | Banatwala .......... G06F 17/30867 |
| 9,762,686 | B2 | 9/2017 | Smith et al. |
| 9,832,156 | B2* | 11/2017 | Lai .......................... H04L 51/32 |
| 2009/0215469 | A1* | 8/2009 | Fisher ..................... H04L 51/32 455/456.3 |
| 2011/0154209 | A1 | 6/2011 | Fan et al. |
| 2011/0185020 | A1* | 7/2011 | Ramamurthy ........ H04L 67/306 709/204 |
| 2012/0042013 | A1 | 2/2012 | Roman et al. |
| 2012/0131103 | A1* | 5/2012 | Fox .......................... H04L 67/02 709/204 |
| 2012/0159337 | A1 | 6/2012 | Travilla et al. |
| 2012/0191776 | A1* | 7/2012 | Ruffner .............. G06F 17/30873 709/204 |
| 2012/0330701 | A1* | 12/2012 | Hyder .................... G06Q 10/00 705/7.11 |
| 2013/0159110 | A1 | 6/2013 | Rajaram et al. |
| 2013/0179802 | A1* | 7/2013 | Martinazzi .............. H04L 67/22 715/753 |
| 2013/0204871 | A1 | 8/2013 | Wong |
| 2013/0238697 | A1* | 9/2013 | Mehta .................... G06Q 50/01 709/204 |
| 2013/0254397 | A1 | 9/2013 | Lai et al. |
| 2013/0275320 | A1* | 10/2013 | Moore ................ G06Q 10/1053 705/321 |
| 2013/0318180 | A1* | 11/2013 | Amin ..................... H04L 65/403 709/206 |
| 2013/0325948 | A1 | 12/2013 | Chen et al. |
| 2013/0346329 | A1 | 12/2013 | Alib-bulatao et al. |
| 2014/0074856 | A1 | 3/2014 | Rao |
| 2014/0089400 | A1 | 3/2014 | Yan et al. |
| 2014/0089816 | A1* | 3/2014 | DiPersia ............... G06F 3/0484 715/753 |
| 2014/0122692 | A1 | 5/2014 | Klein et al. |
| 2014/0173020 | A1 | 6/2014 | Reilly et al. |
| 2014/0297550 | A1* | 10/2014 | Miller ................. G06Q 10/1053 705/321 |
| 2014/0314188 | A1 | 10/2014 | Nagarajan et al. |
| 2014/0317142 | A1* | 10/2014 | Naidu ............... G06F 17/30542 707/780 |
| 2014/0317188 | A1 | 10/2014 | Thorne-yocam |
| 2015/0052456 | A1* | 2/2015 | Engelking ............. H04L 51/046 715/753 |
| 2015/0067048 | A1* | 3/2015 | Kannan .................. H04L 65/40 709/204 |
| 2015/0095121 | A1* | 4/2015 | Bastian ............. G06Q 10/06398 705/7.42 |
| 2015/0159337 | A1 | 6/2015 | Kellner |
| 2015/0215349 | A1 | 7/2015 | Sherman |
| 2015/0237464 | A1 | 8/2015 | Shumaker et al. |
| 2015/0242967 | A1* | 8/2015 | Shsh ..................... G06Q 50/01 705/319 |
| 2015/0347578 | A1 | 12/2015 | Tsai et al. |
| 2015/0347593 | A1 | 12/2015 | Tsai et al. |
| 2015/0347974 | A1 | 12/2015 | Sinha et al. |
| 2015/0379535 | A1 | 12/2015 | Wang et al. |
| 2016/0034425 | A1 | 2/2016 | Liu et al. |
| 2016/0037213 | A1 | 2/2016 | Collins et al. |
| 2016/0044119 | A1 | 2/2016 | Wirth et al. |
| 2016/0063442 | A1* | 3/2016 | Bennett .............. G06Q 10/1053 705/319 |
| 2016/0078133 | A1 | 3/2016 | Santhanam et al. |
| 2016/0104261 | A1 | 4/2016 | Brinton et al. |
| 2016/0132198 | A1* | 5/2016 | Sinclair ................. G06F 3/0482 715/739 |
| 2016/0149850 | A1 | 5/2016 | Pan et al. |
| 2016/0164985 | A1 | 6/2016 | Song et al. |
| 2016/0203523 | A1 | 7/2016 | Spasojevic et al. |
| 2016/0380952 | A1* | 12/2016 | Vora ....................... H04L 51/32 709/206 |
| 2017/0154317 | A1 | 6/2017 | Bruce et al. |
| 2017/0262762 | A1 | 9/2017 | Conover et al. |
| 2017/0323312 | A1 | 11/2017 | Penumaka et al. |

OTHER PUBLICATIONS

"Non Final Office Action Issued in U.S. Appl. No. 14/880,917", dated Nov. 20, 2017, 17 Pages.

"Notice of Allowance Issued in U.S. Appl. No. 14/880,917", dated Oct. 3, 2018, 10 Pages.

"Notice of Allowance Issued in U.S. Appl. No. 14/880,917", dated Oct. 12, 2018, 7 Pages.

"Notice of Non-Compliant Amendment Issued in U.S. Appl. No. 14/880,917", dated May 24, 2018, 3 Pages.

"Response Filed to Non Compliant Amendment Issued in U.S. Appl. No. 14/880,917", filed Jul. 2, 2018, 21 Pages.

"Response Filed to Non Final Office Action in U.S. Appl. No. 14/880,917", filed Mar. 14, 2018, 21 Pages.

"Applicant Initiated Interview Summary Issued in U.S. Appl. No. 14/880,992", dated May 7, 2018, 3 Pages.

"Applicant Initiated Interview Summary Issued in U.S. Appl. No. 14/880,992", dated Jan. 29, 2018, 3 Pages.

"Final Office Action Issued in U.S. Appl. No. 14/880,992", dated Mar. 26, 2018, 14 Pages.

"Non Final Office Action Issued in U.S. Appl. No. 14/880,992", dated Sep. 11, 2017, 14 Pages.

"Non Final Office Action Issued in U.S. Appl. No. 14/880,992", dated Jul. 26, 2018, 16 Pages.

"Response filed in U.S. Appl. No. 14/880,992", filed Feb. 12, 2018, 18 Pages.

"Response filed in U.S. Appl. No. 14/880,992", filed Jun. 21, 2018, 14 Pages.

\* cited by examiner

SUGGESTED CONTENT FOR EMPLOYEE ACTIVATION

RELATED APPLICATIONS

This application claims the benefit of priority of U.S. Provisional Patent Application Ser. No. 62/110,300, filed Jan. 30, 2015, and U.S. Provisional Patent Application Ser. No. 62/083,847, filed Nov. 24, 2014, which applications are incorporated herein by reference in their entirety.

TECHNICAL FIELD

The present application relates generally to data processing systems and, in one specific example, to techniques for identifying suggested online content for company administrators to broadcast to company employees via an online social networking service.

BACKGROUND

Online social networking services such as LinkedIn® are becoming increasingly popular, with many such websites boasting millions of active members. Each member of the online social networking service is able to upload an editable member profile page to the online social networking service. The member profile page may include various information about the member.

BRIEF DESCRIPTION OF THE DRAWINGS

Some embodiments are illustrated by way of example and not limitation in the figures of the accompanying drawings in which.

DETAILED DESCRIPTION

Figure 1:
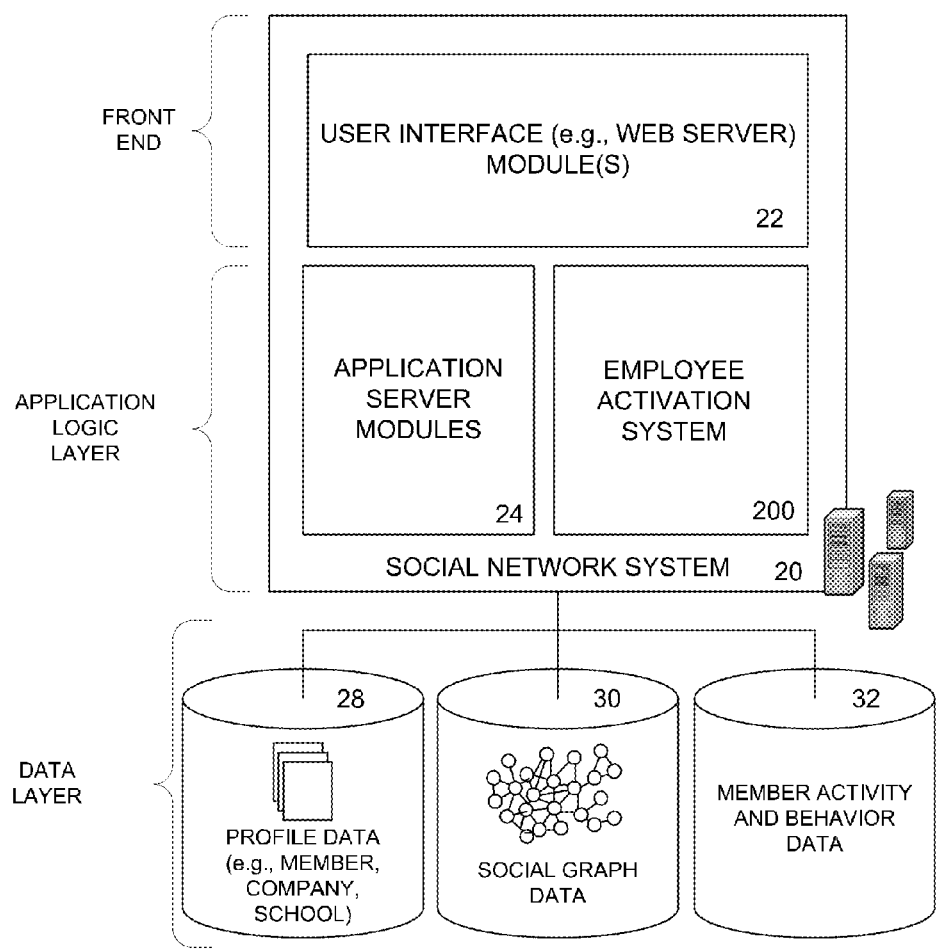
FIG. 1 is a block diagram showing the functional components of a social networking service, consistent with some embodiments of the present disclosure.

Example methods and systems for identifying suggested online content for company administrators to broadcast to company employees via an online social networking service are described. In the following description, for purposes of explanation, numerous specific details are set forth in order to provide a thorough understanding of example embodiments. It will be evident, however, to one skilled in the art that the embodiments of the present disclosure may be practiced without these specific details.

According to various example embodiments, an employee activation system enables company administrators to leverage their employee's social networks in order to expand the reach of the company through various online social networking services. For example, in some embodiments, the employee activation system displays an administrator user interface to an administrator or other personnel associated with a company. The administrator user interface may display various suggested content items, such as news items, articles, publications, etc., such as via a content feed. The employee activation system enables the company administrator to select a specific content item to be broadcast to employees of the company. The system will then broadcast a recommendation to view the selected content item to one or more of the employees of the company.

Thereafter, the relevant employees may receive the broadcasted recommendations to view the specific content item, such as via a mobile application on their mobile device that is associated with the online social networking service. The employee can then browse through the suggested content and share a piece of content among their various networks of connections on various online social networking services, such as Facebook®, Twitter®, Instagram®, LinkedIn® etc. Accordingly, the employee activation system enables a company administrator to broadcast a piece of content to the employees of the company, and then enables the employees of that company to share that content among their networks on various online social networking services.

Thus, by delivering highly-relevant professional content and encouraging content sharing, the employee activation system enables employees to be more productive and successful, by helping them to reach audiences related to their day-to-day work and build their professional brand. Meanwhile, companies are motivated to assist and elevate their employees, and the employee activation system provides companies with the insights necessary to ensure relevant content for their employees. Thus, the employee activation system harnesses company motivation and insight, and the hypothesis that colleagues have a good sense of what content is professionally relevant to others in that company, in order to deliver the right content to the right professionals, and to activate employees on social networks. Accordingly, by improving the relevance of content shared with employees and other users, the system described herein efficiently provides users with more relevant content sooner, which reduces the need for further searching and browsing for content on the part of users. This may result in a reduction in the processing power and network bandwidth demands placed on an online social networking service's hardware and software infrastructure.

FIG. 1 is a block diagram illustrating various components or functional modules of a social networking service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generates various user interfaces (e.g., web pages) with data retrieved from various data sources in the data layer. With some embodiments, individual application server modules 24 are used to implement the functionality associated with various services and features of the social networking service. For instance, the ability of an organization to establish a presence in the social graph of the social networking service, including the ability to establish a customized web page on behalf of an organization, and to publish messages or status updates on behalf of an organization, may be services implemented in independent application server modules 24. Similarly, a variety of other applications or services that are made available to members of the social networking service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social networking service, the person will be prompted to provide some personal information, such as his or her name, age (e.g., birthdate), gender, interests, contact information, hometown, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social networking service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a uni-lateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social networking service may provide a broad range of other applications and services that allow members the opportunity to share and receive information, often customized to the interests of the member. For example, with some embodiments, the social networking service may include a photo sharing application that allows members to upload and share photos with other members. With some embodiments, members may be able to self-organize into groups, or interest groups, organized around a subject matter or topic of interest. With some embodiments, the social networking service may host various job listings providing details of job openings with various organizations.

As members interact with the various applications, services and content made available via the social networking service, the members' behavior (e.g., content viewed, links or member-interest buttons selected, etc.) may be monitored and information concerning the member's activities and behavior may be stored, for example, as indicated in FIG. 1 by the database with reference number 32.

With some embodiments, the social network system 20 includes what is generally referred to herein as an employee activation system 200. The employee activation system 200 is described in more detail below in conjunction with FIG. 2.

Although not shown, with some embodiments, the social network system 20 provides an application programming interface (API) module via which third-party applications can access various services and data provided by the social networking service. For example, using an API, a third-party application may provide a user interface and logic that enables an authorized representative of an organization to publish messages from a third-party application to a content hosting platform of the social networking service that facilitates presentation of activity or content streams maintained and presented by the social networking service. Such third-party applications may be browser-based applications, or may be operating system-specific. In particular, some third-party applications may reside and execute on one or more mobile devices (e.g., phone, or tablet computing devices) having a mobile operating system.

Figure 2:
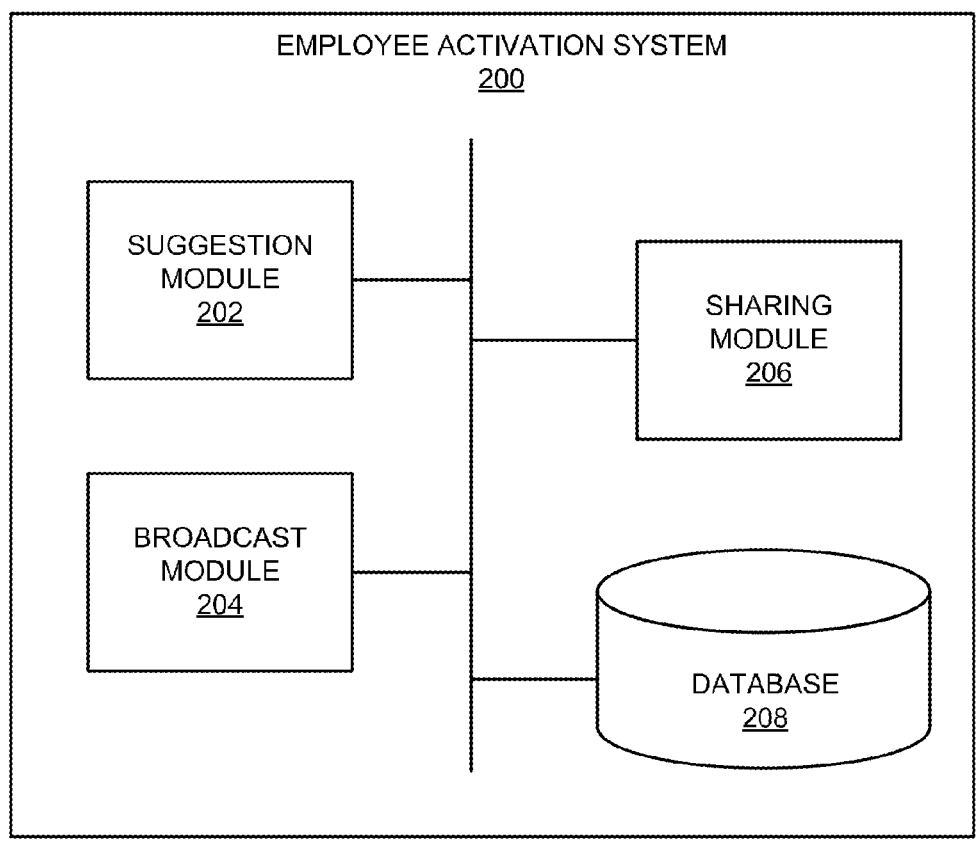
FIG. 2 is a block diagram of an example system, according to various embodiments.

Turning now to FIG. 2, an employee activation system 200 includes a suggestion module 202, a broadcast module 204, a sharing module 206, and a database 208. The modules of the employee activation system 200 may be implemented on or executed by a single device such as a content suggestion device, or on separate devices interconnected via a network. The aforementioned content suggestion device may be, for example, one or more client machines or application servers. The operation of each of the aforementioned modules of the employee activation system 200 will now be described in greater detail in conjunction with the various figures.

Figure 3:
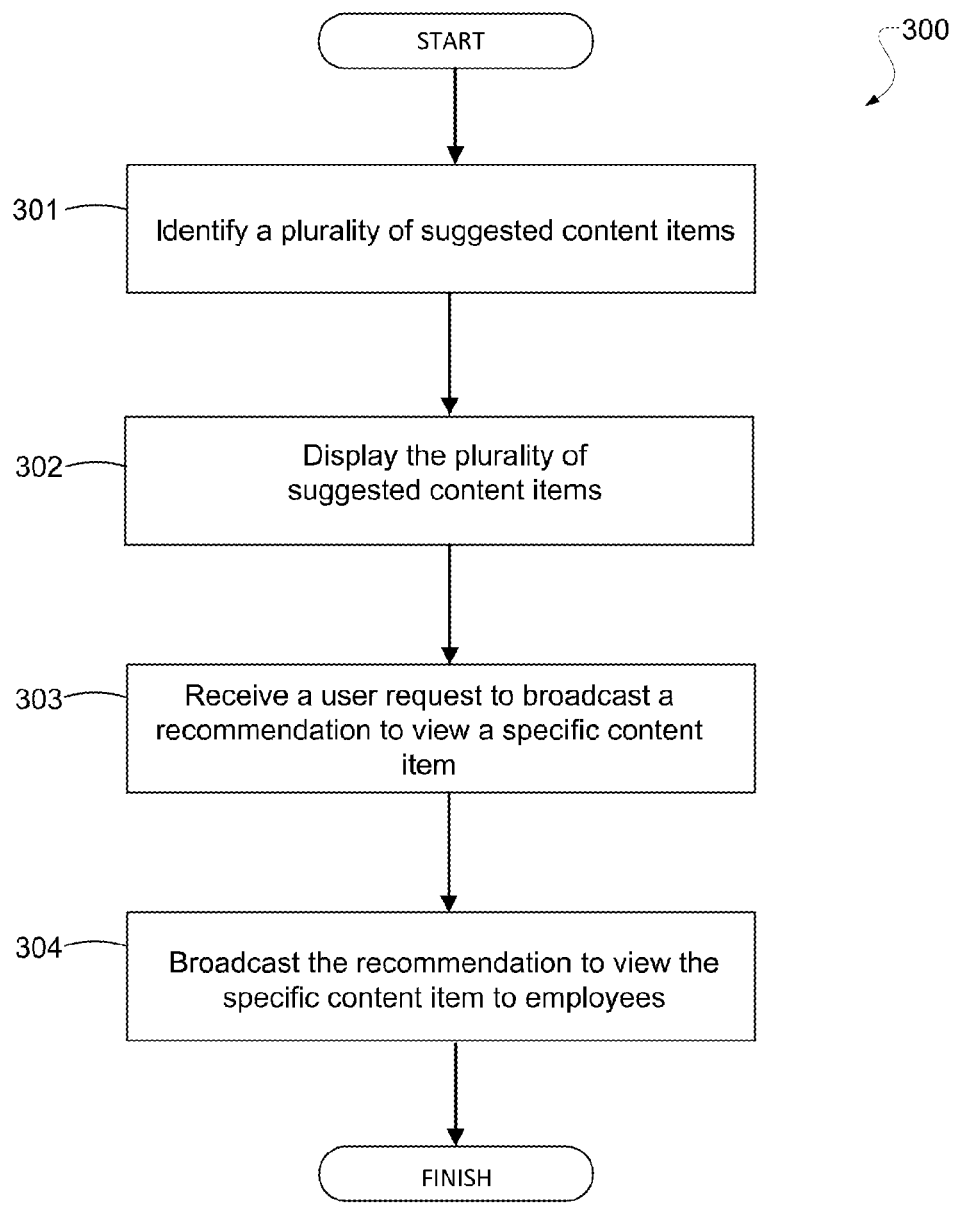
FIG. 3 is a flowchart illustrating an example method, according to various embodiments.

FIG. 3 is a flowchart illustrating an example method 300, consistent with various embodiments described herein. The method 300 may be performed at least in part by, for example, the employee activation system 200 illustrated in FIG. 2 (or an apparatus having similar modules, such as one or more client machines or application servers). In operation 301, the suggestion module 202 identifies a plurality of suggested content items as being relevant to employees of a company that are members of an online social networking service. Techniques for identifying the suggested content items are described in more detail below. In operation 302, the suggestion module 202 displays, via an administrator user interface, to a user (e.g., an administrator) associated with the company, the plurality of suggested content items that were identified in operation 301. In some embodiments, the suggested content items are displayed in a content feed in the administrator user interface (e.g., see FIG. 4). The administrator user interface may displayed on, for example, a display screen of a mobile or desktop computing device being utilized by the administrator. In operation 303, the suggestion module 202 receives, via the administrator user interface, a user request to broadcast a recommendation of a specific one of the suggested content items (that was displayed in operation 302) to one or more of the employees of the company. For example, the administrator may select the "BROADCAST" button associated with one of the articles in the content feed displayed in FIG. 4. In operation 304, the broadcast module 204 broadcasts the recommendation to view the specific content item to the employees of the company that were identified in operation 303. For example, in some embodiments, the broadcast module 204 accesses a list of employees of the company that have indicated an interested in receiving broadcasted recommendations from company administrators, where such a list may be stored in the database 208. Employees may indicate an interest in receiving broadcasted recommendations by, for example, selecting an appropriate user interface element or button in a webpage associated with the online social networking service, in an email transmitted by the online social networking service, in a mobile application associated with the online social networking service, etc.

In other embodiments, the administrator can specify a subset of employees of the company that have subscribed to or joined a particular topic-based group (e.g., "leadership" or "engineering"). For example, employees may subscribe to or join a topic-based group by, for example, selecting an appropriate user interface element or button in a webpage associated with the online social networking service, in an email transmitted by the online social networking service, in a mobile application associated with the online social networking service, etc. Thereafter, the administrator may select, via a user interface, a particular topic-based group (e.g., in connection with operation 303) in order to broadcast the selected content item to employees of the company that have subscribed to that topic-based group.

In other embodiments, the broadcast module 204 automatically identifies one or more employees of the company that are members of the online social networking service, based on member profile data of the employees maintained by the online social networking service (e.g., stored in database 208). For example, the broadcast module 204 may identify all members that have an employer attribute, job attribute, company attribute, etc., that corresponds to the relevant company of the administrator. In some embodiments, the broadcasting comprises displaying the recommendation to view the specific content item via an employee user interface displayed on one or more mobile devices associated with the employees (see FIG. 6).

Figure 5:
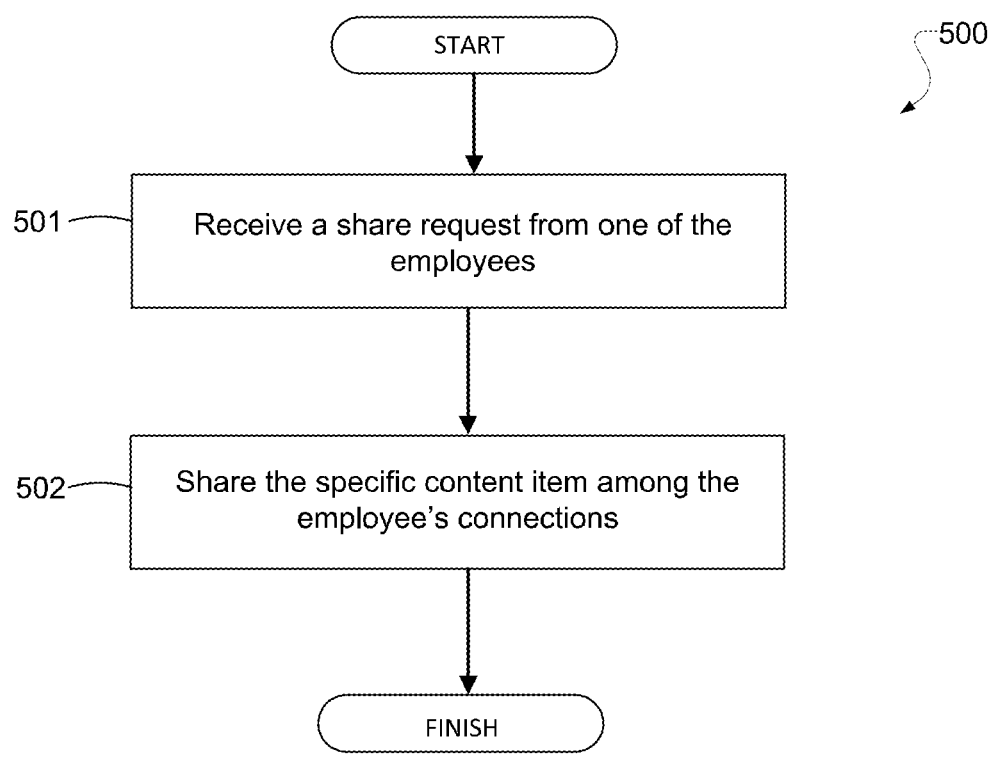
FIG. 5 is a flowchart illustrating an example method, according to various embodiments.
Figure 6:
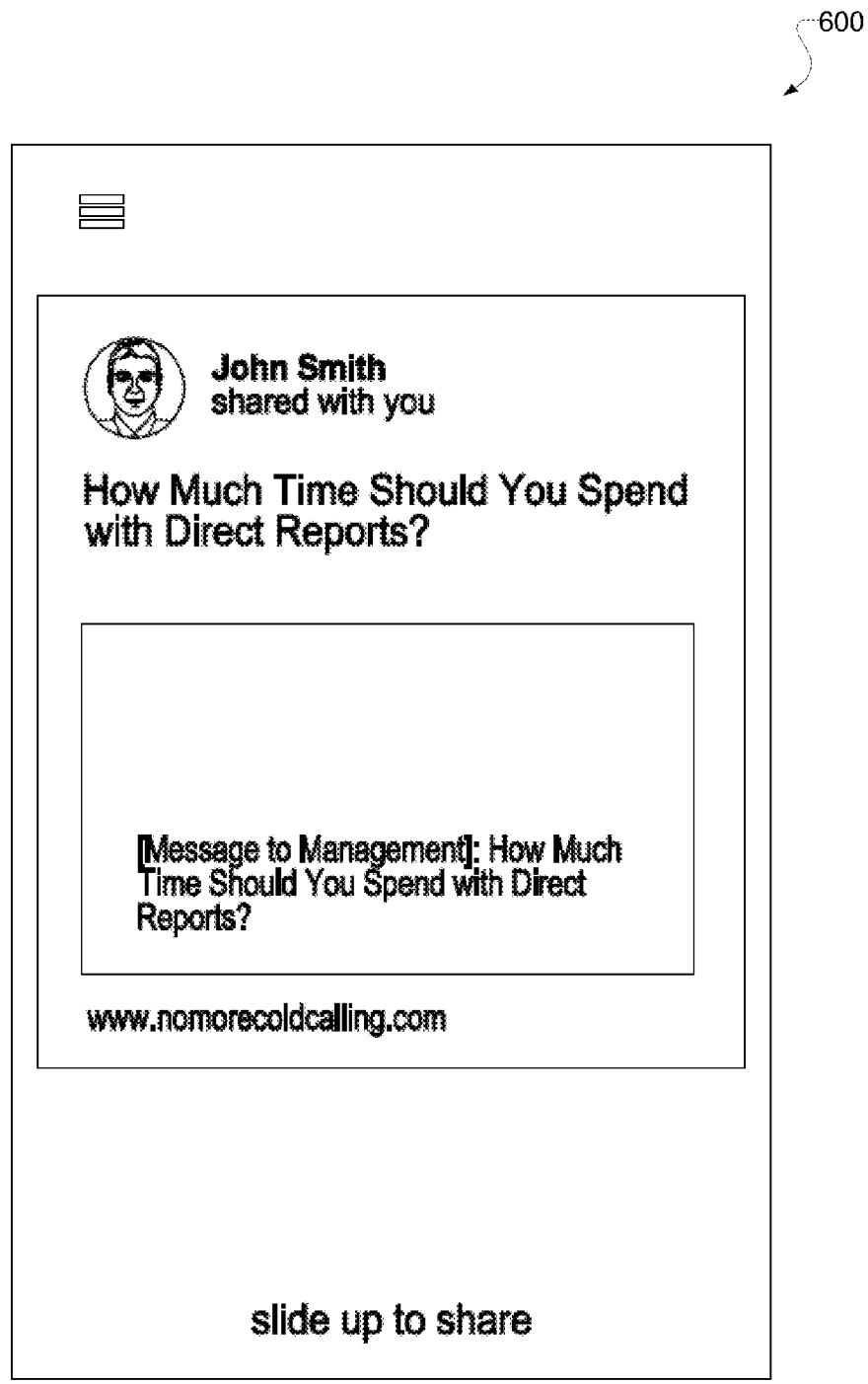
FIG. 6 illustrates an example portion of a user interface, according to various embodiments.
Figure 7:
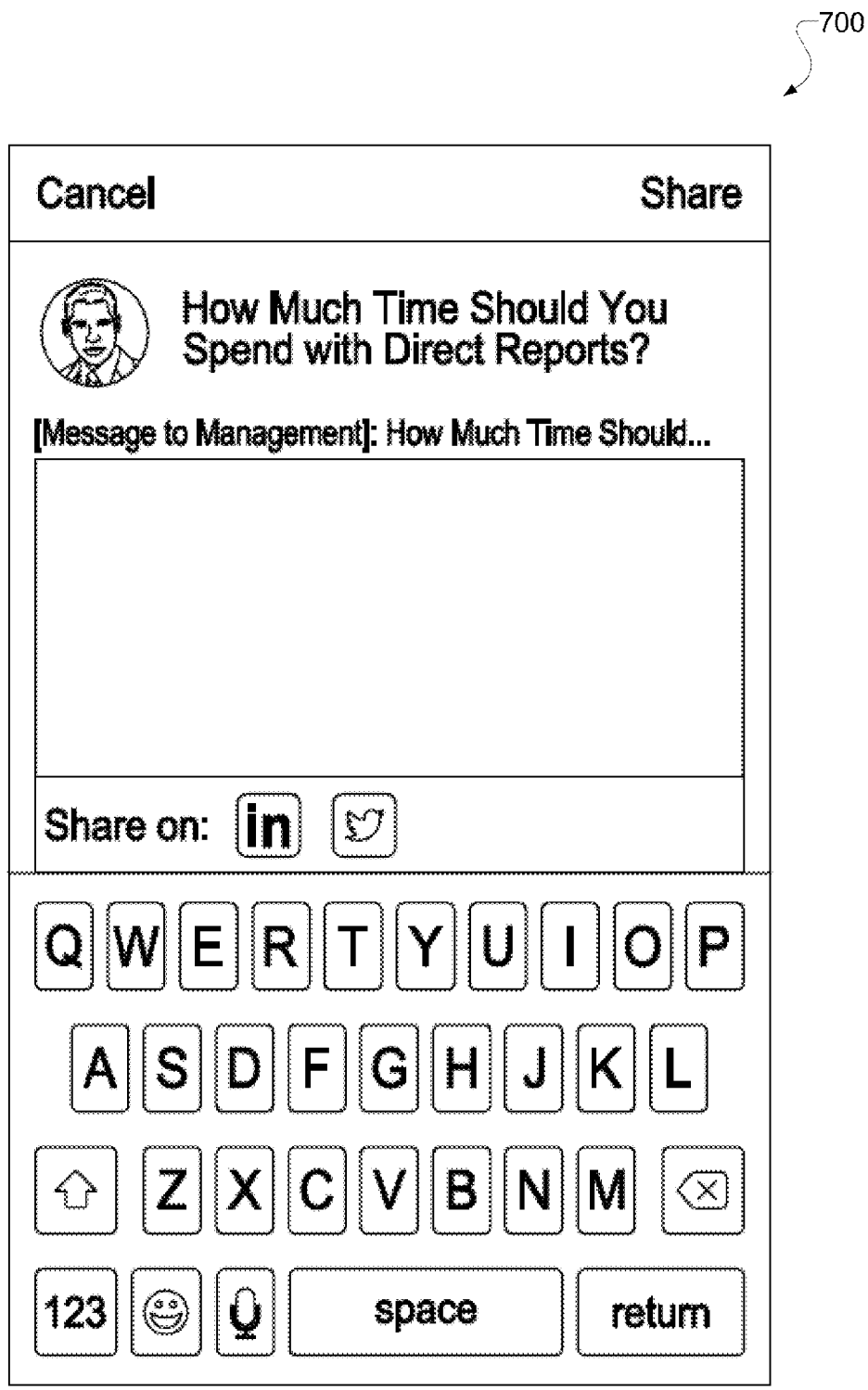
FIG. 7 illustrates an example portion of a user interface, according to various embodiments.

FIG. 5 is a flowchart illustrating an example method 500 of employee sharing of a content item, consistent with various embodiments described herein. The method 500 may be performed at least in part by, for example, the employee activation system 200 illustrated in FIG. 2 (or an apparatus having similar modules, such as one or more client machines or application servers). In operation 501, the sharing module 206 receives, via an employee user interface, a share request from one of the employees of a company that received a broadcast of a specific content item (see operation 304 in FIG. 3). The employee user interface displayed on a display screen of a mobile device associated with the employee. The share request is a request to share the specific content item among the employee's connections on a specific online social networking service, such as Facebook®, Twitter®, Instagram®, LinkedIn® etc. For example, FIG. 6 illustrates an example of an employee user interface 600 displayed via a mobile application installed on a mobile device of an employee. The employee user interface 600 displays a content item entitled "Message to management; how much time should you spend with the direct reports?" shared by a company administrator "John Smith". The employee may select to this article for sharing (e.g., by sliding up on the user interface 600), and the sharing module 206 may display the user interface 700 illustrated in FIG. 7, which enables the employee to prepare and send a share message (e.g., by displaying keypad allowing the employee to modify the title of the share message). In particular, the sharing module 206 may display, via the employee user interface 700, indicia of multiple online social networking services (e.g., the LinkedIn® symbol and the Twitter® symbol as illustrated in FIG. 7), and the sharing module 206 may receive, via the employee user interface, a user selection of one of the indicia associated with a specific online social networking service. In operation 502, the sharing module 206 shares the specific content item among the employee's connections on the specific online social networking service that was specified in operation 501. For example, the sharing module 206 may cause the content item to appear in a content feed or stream of the selected online social networking service, where such a content feed or stream is viewable to the employee's connections on that selected online social networking service. It is contemplated that the operations of method 500 may incorporate any of the other features disclosed herein. Various operations in the method 500 may be omitted or rearranged, as necessary.

Note that the various employee user interfaces described herein (e.g., see FIGS. 6 and 7) may displayed on a desktop, tablet, or any computing device, or within any type of electronic message, including an e-mail, text message (e.g., a short messaging service (SMS) message, a multimedia messaging service (MMS) message, etc.), an instant message associated with an online social network (e.g., Facebook, LinkedIn, Wechat, WhatsApp, etc.), a chat message associated with an online chat service, and so on.

Figure 4:
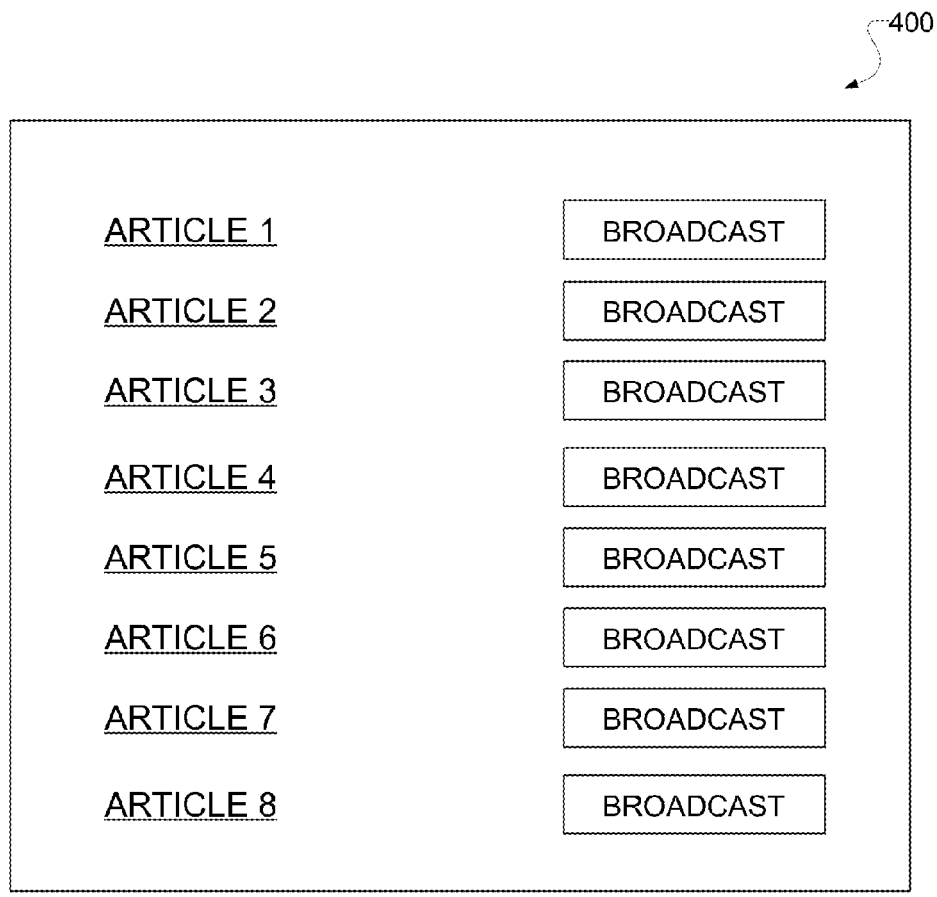
FIG. 4 illustrates an example portion of a user interface, according to various embodiments.

As described above, the suggestion module 202 may display various suggested content items, such as via a content feed in the administrator user interface (see FIG. 4). The suggestion module 202 may identify these content items using various techniques described in more detail below.

In some embodiments, the suggested content items are identified, based on the suggested content items being sourced from web sources (e.g., websites, blogs, etc.) or various entities (e.g., members, Influencers, groups, companies, schools, etc. on LinkedIn®) that are followed by the administrator on an online social networking service.

In some embodiments, the suggested content items are identified, based on engagements (e.g., views, clicks, likes, shares, follows, comments, etc.) with the suggested content items by member connections of the administrator on an online social networking service.

In some embodiments, the suggested content items are identified, based on engagements (e.g., views, clicks, likes, shares, follows, comments, etc.) with the suggested content items by one or more employees of the administrator's company on the online social networking service.

In some embodiments, one or more related companies that are related to the administrator's company are identified (as described in more detail below). The suggested content items are then identified, based on broadcasts of recommendations to view the suggested content items by administrators associated with the related companies on the online social networking service. In some embodiments, the suggested content items are identified, based on engagements with the suggested content items by one or more employees of the related companies on the online social networking service.

In some embodiments, the one or more related companies are identified by determining that the related companies are associated with the same industry attribute on the online social networking service as the administrator's company. In some embodiments, the one or more related companies are identified by determining that one or more members of the online social networking service that are employees of the related companies share member profile attributes with one or more of the employees of the company. Examples of member profile attributes include past or present education information, past or present employment information, past or present volunteer information, resume information, skills, endorsements, recommendations, title, industry, company, company size, seniority level, activities, group membership, images, photos, preferences, news, status, links or URLs on the profile page, and so forth. In some embodiments, the one or more related companies are identified by determining that one or more members of the online social networking service that are employees of the related companies have a high connection strength with one or more of the employees of the administrator's company.

In some embodiments, the plurality of suggested content items are identified based on the administrator's detected preferences and previous activity, such as based on content previously broadcasts by the administrator. For example, in some embodiments, the suggestion module 202 identifies attributes of one or more content items that the user has previously broadcasted or previously interacted with, and then identifies suggested content items, based on the suggested content items being associated with the same identified attributes. Examples of such content item attributes include author, title, keywords, genre, topic, source, etc. The suggestion module 202 may also prioritize suggested content in a feed based on such attributes (e.g., content having more attributes in common with previously broadcasted content is displayed higher in the feed than content having less attributes in common with previously broadcasted content).

In some embodiments, the plurality of suggested content items are identified based on content sourced from a current or trending news item, publication, or article mentioning the company of the administrator. For example, the suggested content item may be sourced from news items, publications, or articles mentioning the company that are appearing or trending in a content feed of the online social networking service, on news websites, or in a news aggregator service such as Google® news. Moreover, the LinkedIn® online social networking service includes a "Mentioned In The News" or "Companies Mentioned In The News" product that is an automated feature that identifies online articles on companies (e.g., companies that a user is following on LinkedIn®), and then displays those articles in the user's LinkedIn® homepage status update feed. Thus, in some embodiments, suggested content items may be sourced from "Mentioned In The News" articles that describe a given company (e.g., the company of the administrator).

In some embodiments, the plurality of suggested content items are identified based on trending content by decision makers or LinkedIn® Influencers in given industries. For example, the system 200 may identify who is a decision maker or LinkedIn® Influencer, then examine all decision makers or LinkedIn® Influencers for a given industry, and then identify the set of content that they are engaging with (e.g., posting, sharing, commenting on, liking, etc.). The administrator can then specify, via a user interface, an industry they desire to follow to thereby receive—as suggested content items—the content being engaged with by the corresponding decision makers or LinkedIn® Influencers in that specified industry. The system 200 may identify a decision maker or LinkedIn® Influencer based on decision maker score or influencer score associated with members of an online social networking service, as described in detail in pending U.S. patent application Ser. No. 14/572,390, filed Dec. 16, 2014, which is incorporated herein by reference.

Figure 8:
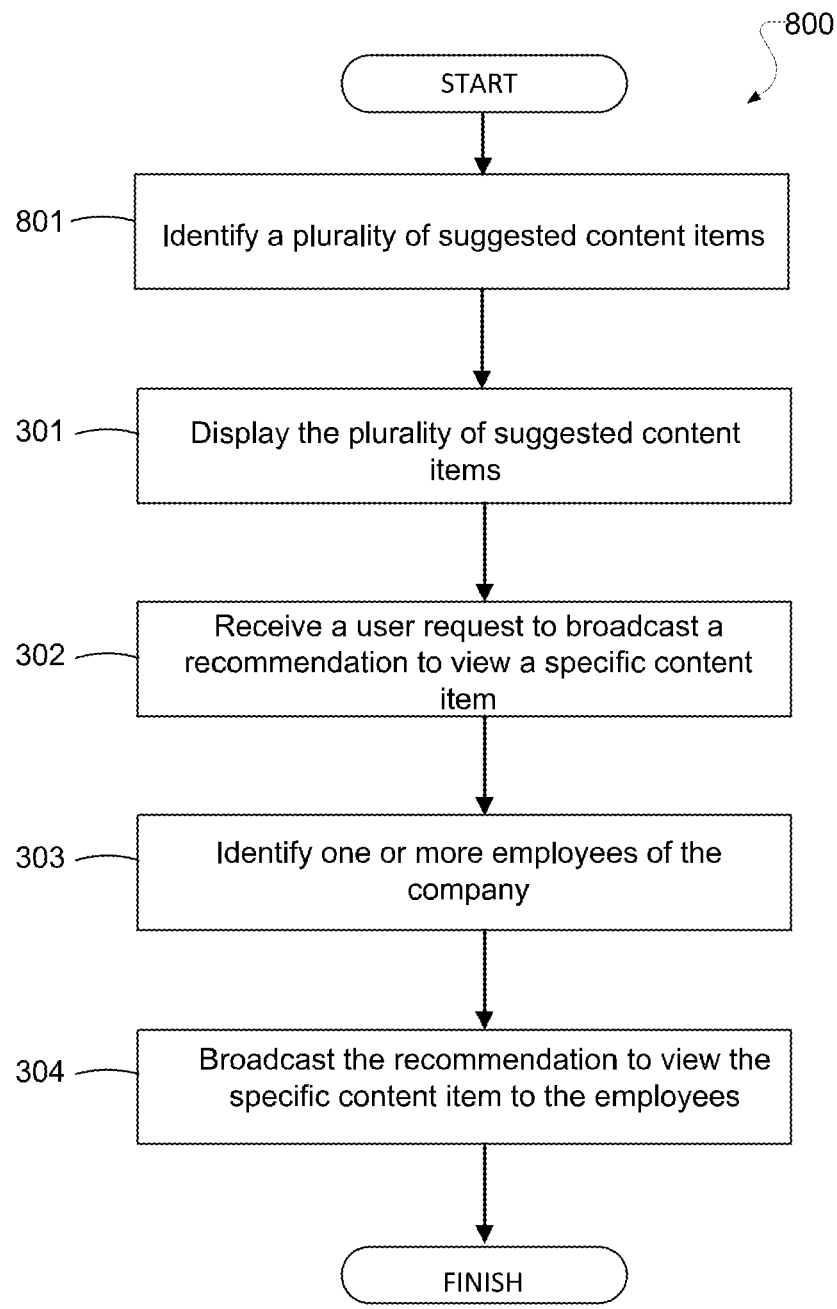
FIG. 8 is a flowchart illustrating an example method, according to various embodiments.

FIG. 8 is a flowchart illustrating an example method 800, consistent with various embodiments described herein. The method 800 may be performed at least in part by, for example, the employee activation system 200 illustrated in FIG. 2 (or an apparatus having similar modules, such as one or more client machines or application servers). In operation 801, the suggestion module 202 identifies a plurality of suggested content items, consistent with various techniques described herein. Thereafter, operations 301-304 in FIG. 8 are similar to operations 301-304 in FIG. 3. It is contemplated that the operations of method 800 may incorporate any of the other features disclosed herein. Various operations in the method 800 may be omitted or rearranged, as necessary.

Figure 9:
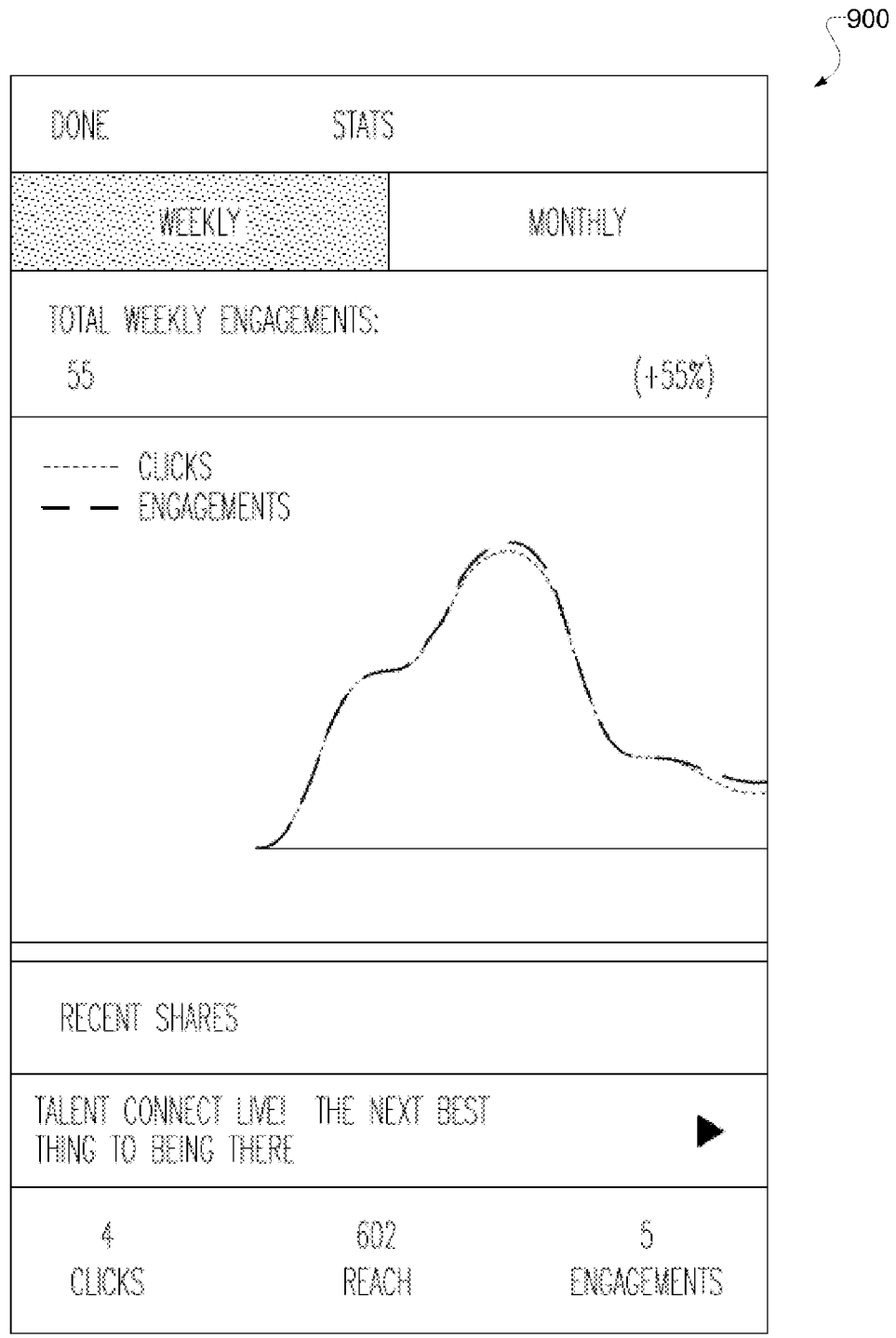
FIG. 9 illustrates an example portion of a user interface, according to various embodiments.

In some embodiments, the sharing module 206 may display, via the employee user interface, various analytic data related to the content items previously shared by the employee with their social networks. For example, the sharing module 206 may display, via the employee user interface, a number of engagements with content items previously shared by the employee, wherein the engagements includes a number of clicks, shares, likes, follows, comments, mentions, etc. For example, FIG. 9 illustrates an employee user interface 900 that identifies information about content items previously shared by the employee over a given time period (e.g., the last week or month), including a number of engagements and engagement trends received generally over all shared items or for specific items. The user interface 900 also identifies individual content items that were recently shared by the employee (e.g., the content item entitled "Talent connect to live! The next best thing to being there"), as well as a number of clicks, a reach (e.g., number of viewers), and a number of engagements associated with each content item. In some embodiments, the reach corresponds to a potential reach value indicating a number of social network connections of the respective employee. In some embodiments, the reach corresponds to an actual reach value indicating a number of viewers of the content items shared by the respective employee.

Figure 10:
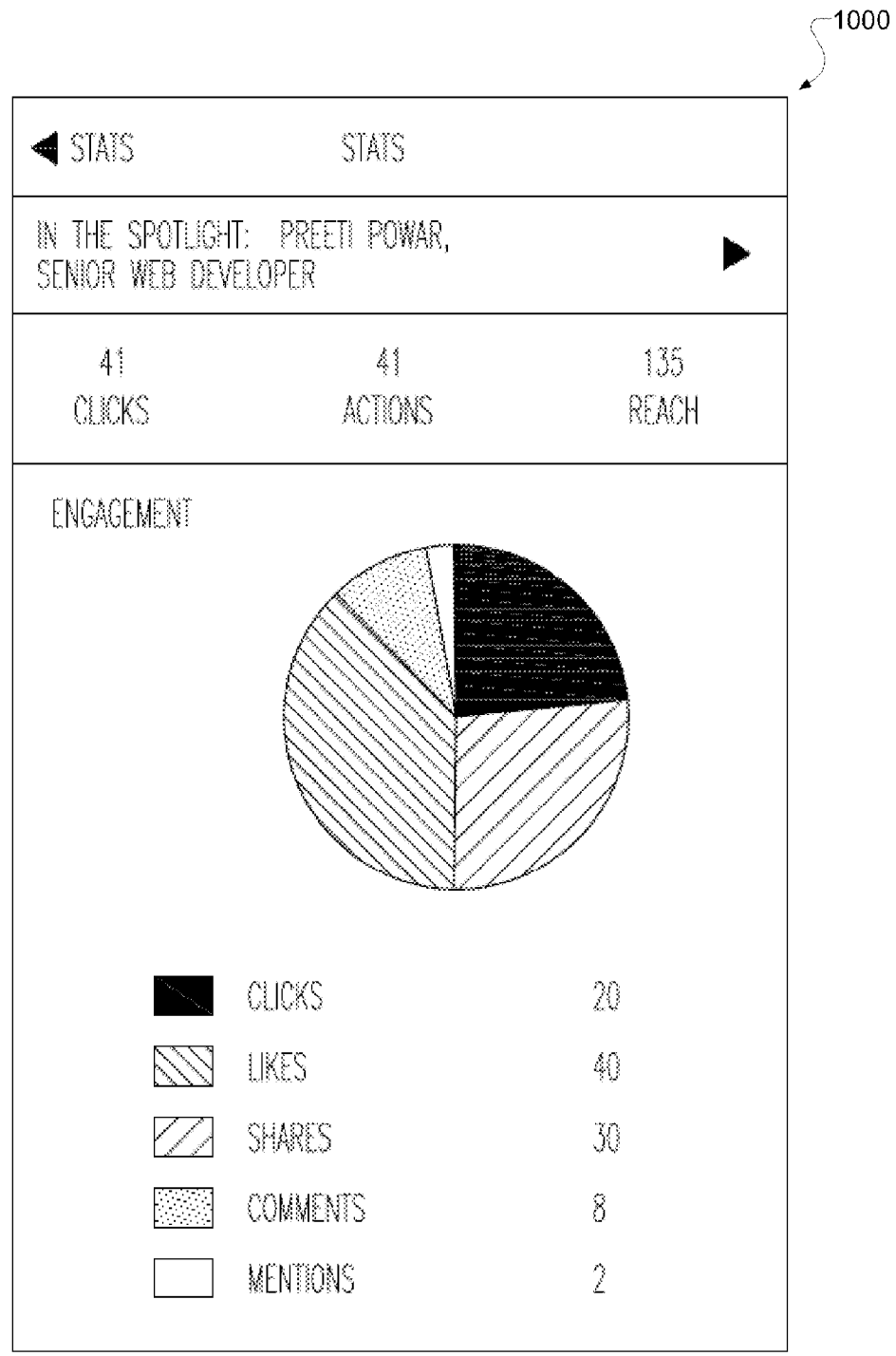
FIG. 10 illustrates an example portion of a user interface, according to various embodiments.

If the employees selects one of these previously shared content items, the sharing module 206 may display the user interface 1000 illustrated in FIG. 10 that provides more information about how others in the employees various networks engaged with this previously shared content item. For example, the user interface 1000 displays information about the number and relative proportion of different types of engagements received (including a number of clicks, shares, likes, comments, mentions, follows, etc.) associated with this shared article.

Figure 11:
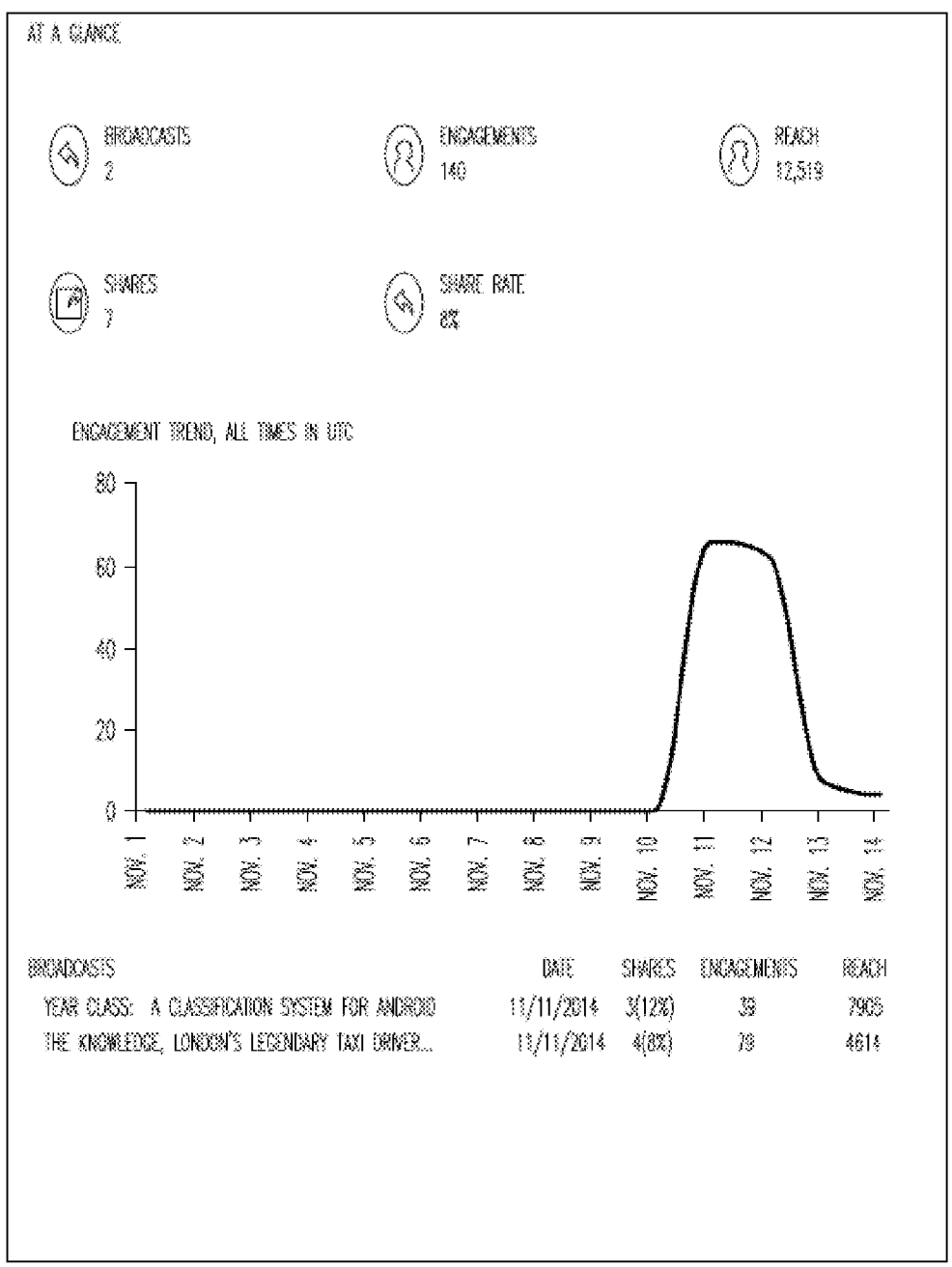
FIG. 11 illustrates an example portion of a user interface, according to various embodiments.

In some embodiments, the broadcast module 204 may display, via the administrator user interface, various analytics information related to content items previously broadcasted by the administrator, as illustrated in FIG. 11. For example, the lower portion of the user interface 1100 includes a list of previously broadcasted content items, a number of engagements associated with each of the previously broadcasted content items, number of subsequent employee shares associated with each of the previously broadcasted content items, a reach associated with each of previously broadcasted content items, and a share rate associated with each of the previously broadcasted content items (e.g., the number of employees that shared a content item in relation to the number of employees that received it). The top and center portions of the user interface 1100 also displays a general number of broadcasts, engagements, reach, shares, share rate, engagement trends, etc., based on all broadcasted items during a given time period.

Figure 12:
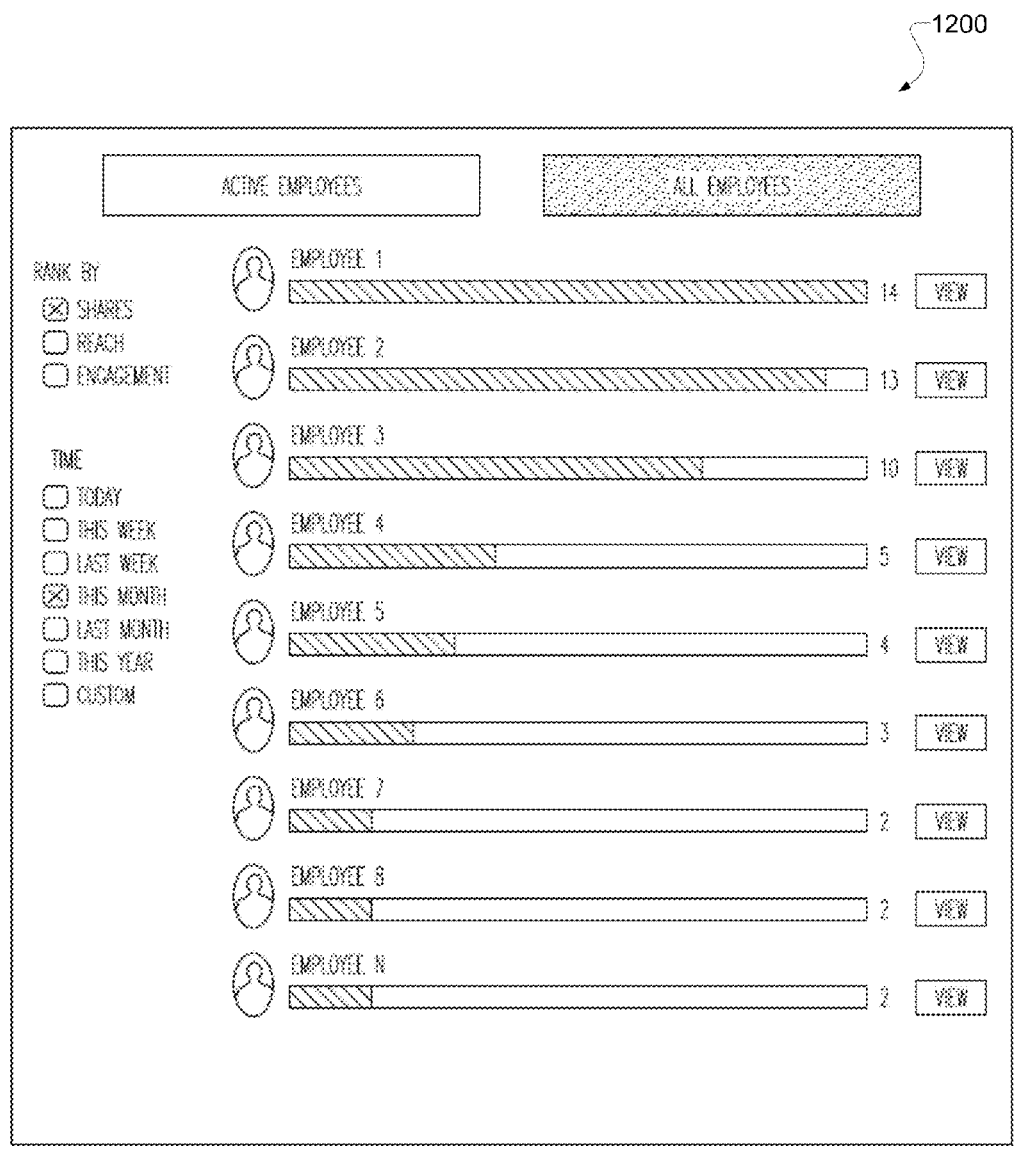
FIG. 12 illustrates an example portion of a user interface, according to various embodiments.

In some embodiments, the broadcast module 204 may display, via the administrator user interface, a leaderboard user interface, such as leaderboard user interface 1200 in FIG. 12. The leaderboard user interface 1200 includes a list of one or more employees of the administrator's company, a number of shares associated with each of the employees in the list (e.g., during a predetermined time interval), a reach associated with each of the employees in the list (e.g., during a predetermined time interval), a number of engagements associated with content shared by each of the employees in the list (e.g., during a predetermined time interval), and so on.

Example Mobile Device

Figure 13:
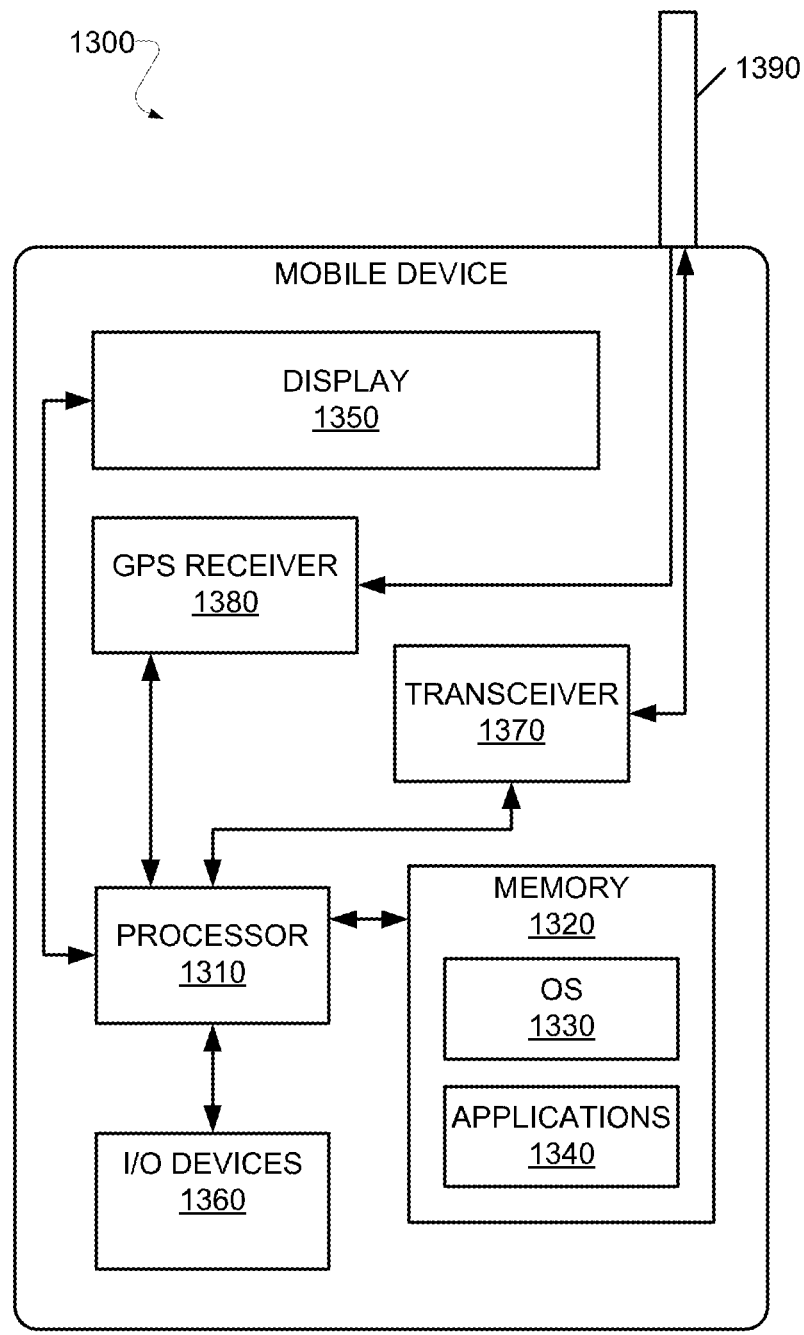
FIG. 13 illustrates an example mobile device, according to various embodiments.

FIG. 13 is a block diagram illustrating the mobile device 1300, according to an example embodiment. The mobile device may correspond to, for example, one or more client machines or application servers. One or more of the modules of the system 200 illustrated in FIG. 2 may be implemented on or executed by the mobile device 1300. The mobile device 1300 may include a processor 1310. The processor 1310 may be any of a variety of different types of commercially available processors suitable for mobile devices (for example, an XScale architecture microprocessor, a Microprocessor without Interlocked Pipeline Stages (MIPS) architecture processor, or another type of processor). A memory 1320, such as a Random Access Memory (RAM), a Flash memory, or other type of memory, is typically accessible to the processor 1310. The memory 1320 may be adapted to store an operating system (OS) 1330, as well as application programs 1340, such as a mobile location enabled application that may provide location based services to a user. The processor 1310 may be coupled, either directly or via appropriate intermediary hardware, to a display 1350 and to one or more input/output (I/O) devices 1360, such as a keypad, a touch panel sensor, a microphone, and the like. Similarly, in some embodiments, the processor 1310 may be coupled to a transceiver 1370 that interfaces with an antenna 1390. The transceiver 1370 may be configured to both transmit and receive cellular network signals, wireless data signals, or other types of signals via the antenna 1390, depending on the nature of the mobile device 1300. Further, in some configurations, a GPS receiver 1380 may also make use of the antenna 1390 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 14:
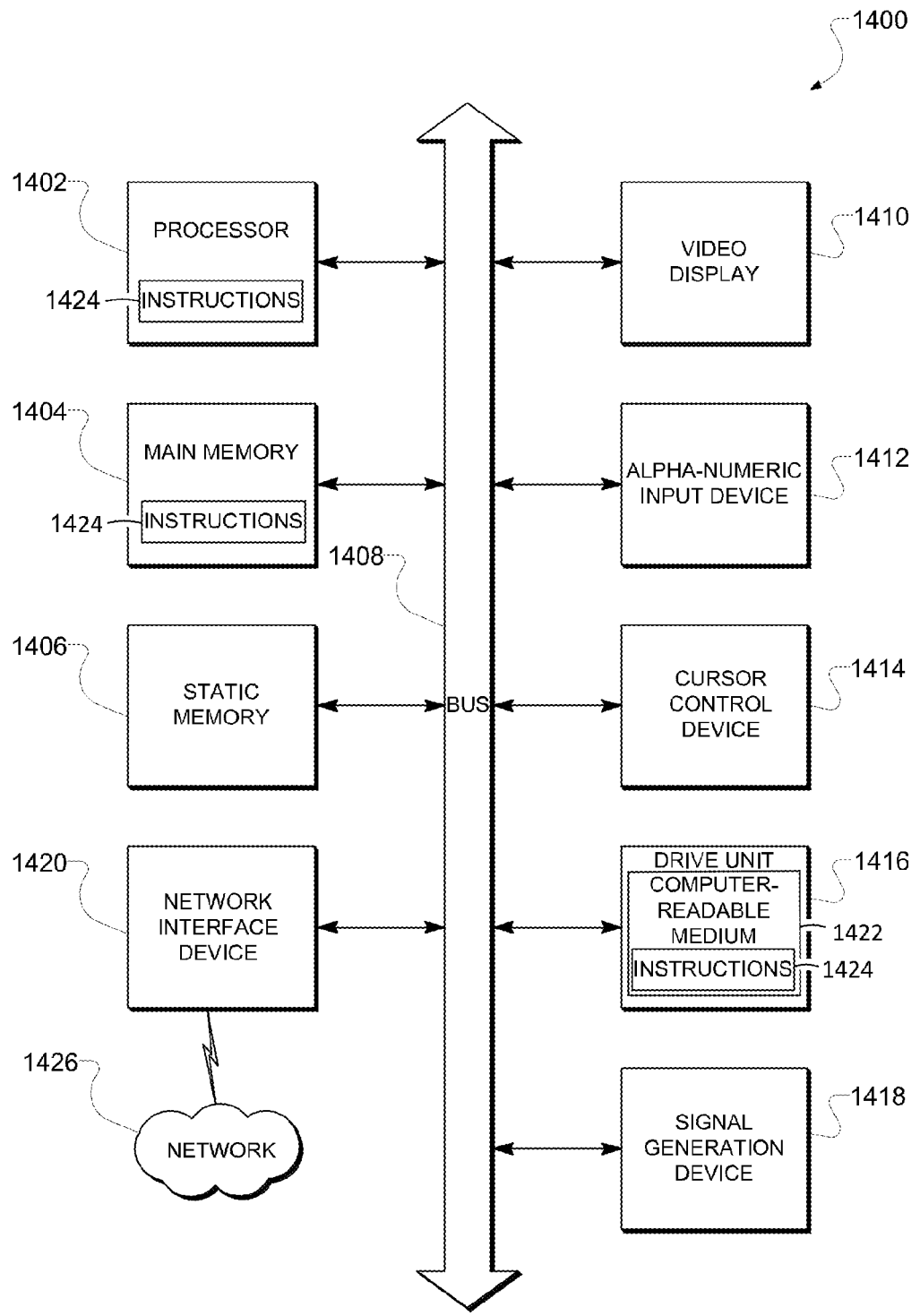
FIG. 14 is a diagrammatic representation of a machine in the example form of a computer system within which a set of instructions, for causing the machine to perform any one or more of the methodologies discussed herein, may be executed.

FIG. 14 is a block diagram of machine in the example form of a computer system 1400 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard or a touch-sensitive display screen), a user interface (UI) navigation device 1414 (e.g., a mouse), a disk drive unit 1416, a signal generation device 1418 (e.g., a speaker) and a network interface device 1420.

Machine-Readable Medium

The disk drive unit 1416 includes a machine-readable medium 1422 on which is stored one or more sets of instructions and data structures (e.g., software) 1424 embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable media.

While the machine-readable medium 1422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    identifying, from a plurality of available content items, a set of suggested content items as being relevant to employees of a company that are members of a first online social networking service, the set of suggested content items being a subset of the plurality of available content items;
    displaying, via an administrator user interface for the first online social networking service, the set of suggested content items to a first user associated with the company;
    receiving, via the administrator user interface for the first online social networking service, a user request to broadcast a recommendation to view a specific content item of the set of suggested content items to one or more of the employees of the company that are members of the first online social networking service;
    broadcasting the recommendation to view the specific content item to the employees of the company, causing the specific content item to be displayed via a user interface of the first online social networking service on mobile devices of the employees, the specific content item displayed along with one or more user interface elements enabling a respective employee to share the specific content item on one or more other social networking services that are different than the first social networking service;
    receiving, from a mobile device of a first employee of the employees, a share request to share the specific content item amongst the first employee's connections on a second social networking service that is different than the first social networking service; and
    in response to receiving the share request, sharing the specific content item among the first employee's connections on the second online social networking service, the employee's connections on the second online social networking service including at least one user that is not an employee of the company, wherein sharing the specific content item among the first employee's connections on the second online social networking service causes the specific content item to be displayed via a user interface of the second online social networking service on a mobile device of the at least one user.

2. The method of claim 1, further comprising:
    causing, on the mobile device of the first employee, display of a number of engagements with the specific content item shared by the first employee, the engagements including a number of clicks, shares, likes, follows, and comments.

3. The method of claim 1, wherein the set of suggested content e s are displayed in a content feed in the administrator user interface.

4. The method of claim 1, further comprising:
    displaying, via the administrator user interface, a list of previously broadcasted content items, a number of engagements associated with each of the previously broadcasted content items, number of employee shares associated with each of the previously broadcasted content items, a reach associated with each of previously broadcasted content items, and a share rate associated with each of the previously broadcasted content items.

5. The method of claim 1, further comprising:
    displaying, via the administrator user interface, a leaderboard user interface indicating a list of one or more employees of the company, a number of shares associated with each of the employees in the list, and a reach associated with each of the employees in the list.

6. The method of claim 5, wherein the reach corresponds to a potential reach value indicating a number of social network connections of the respective employee, or an actual reach value indicating a number of viewers of the content items shared by the respective employee.

7. The method of claim 1, further comprising:
identifying the set of suggested content items, based on the suggested content items being sourced from web sources or members followed by the user on the first online social networking service.

8. The method of claim 1, wherein identifying the plurality set of suggested content items is based on engagements with the suggested content items by member connections of the user on the first online social networking service.

9. The method of claim 1 wherein identifying the set of suggested content items is based on engagements with the suggested content items by one or more employees of the company on the first online social networking service.

10. The method of claim 1, further comprising:
identifying one or more related companies that are related to the company, wherein identifying the set of suggested content items is based on broadcasts of recommendations to view the suggested content items by one or more users associated with the related companies on the first online social networking service.

11. The method of claim 1, further comprising:
identifying one or more related companies that are related to the company, wherein identifying the set of suggested content items is based on engagements with the suggested content items by one or more employees of the related companies on the first online social networking service.

12. The method of claim 11, wherein the one or more related companies are identified by determining that the related companies are associated with the same industry attribute on the first online social networking service as the company.

13. The method of claim 11, wherein the one or more related companies are identified by determining that one or more members of the first online social networking service that are employees of the related companies share member profile attributes with one or more of the employees of the company.

14. The method of claim 11, wherein the one or more related companies are identified by determining that one or more members of the first online social networking service that are employees of the related companies have a high connection strength with one or more of the employees of the company.

15. The method of claim 1, further comprising:
identifying attributes of one or more content items that the user has previously broadcasted or previously interacted with; and
identifying the set of suggested content items, based on the suggested content items being associated with the identified attributes.

16. A system comprising:
one or more computer processors; and
one or more computer-readable mediums storing instructions that; when executed by the one or more computer processors, cause the system to perform operations comprising:
identifying, from a plurality of available content items, a set of suggested content items as being relevant to employees of a company that are members of a first online social networking service, the set of suggested content items being a subset of the plurality of available content items;
displaying, via an administrator user interface for the first online social networking service, the set of suggested content items to a first user associated with the company;
receiving, via the administrator user interface for the first online social networking service, a user request to broadcast a recommendation to view a specific content item of the set of suggested content items to one or more of the employees of the company that are members of the first online social networking service;
broadcasting the recommendation to view the specific content item to the employees of the company, causing the specific content item to be displayed via a user interface of the first online social networking service on mobile devices of the employees, the specific content item displayed along with one or more user interface elements enabling a respective employee to share the specific content item on one or more other social networking services that are different than the first social networking service;
receiving, from a mobile device of a first employee of the employees, a share request to share the specific content item amongst the first employee's connections on a second social networking service that is different than the first social networking service; and
in response to receiving the share request, sharing the specific content item among the first employee's connections on the second online social networking service, the employee's connections on the second online social networking service including at least one user that is not an employee of the company, wherein sharing the specific content item among the first employee's connections on the second online social networking service causes the specific content item to be displayed via a user interface of the second online social networking service on a mobile device of the at least one user.

17. A non-transitory machine-readable storage medium comprising instructions that, when executed by one or more processors of a machine, cause the machine to perform operations comprising:
identifying, from a plurality of available content items, a set of suggested content items as being relevant to employees of a company that are members of a first online social networking service, the set of suggested content items being a subset of the plurality of available content items;
displaying, via an administrator user interface for the first online social networking service, the set of suggested content items to a first user associated with the company;
receiving, via the administrator user interface for the first online social networking service, a user request to broadcast a recommendation to view a specific content item of the set of suggested content items to one or more of the employees of the company that are members of the first online social networking service;
broadcasting the recommendation to view the specific content item to the employees of the company, causing the specific content item to be displayed via a user interface of the first online social networking service on mobile devices of the employees, the specific content item displayed along with one or more user interface elements enabling a respective employee to share the specific content item on one or more other social networking services that are different than the first social networking service;

receiving, from a mobile device of a first employee of the employees, a share request to share the specific content item amongst the first employee's connections on a second social networking service that is different than the first social networking service; and in response to receiving the share request, sharing the specific content item among the first employee's connections on the second online social networking service, the employee's connections on the second online social networking service including at least one user that is not an employee of the company, wherein sharing the specific content item among the first employee's connections on the second online social networking service causes the specific content item to be displayed via a user interface of the second online social networking service on a mobile device of the at least one user.

\* \* \* \* \*

UNITED STATES PATENT AND TRADEMARK OFFICE
CERTIFICATE OF CORRECTION

PATENT NO. : 10,243,911 B2
APPLICATION NO. : 14/880959
DATED : March 26, 2019
INVENTOR(S) : Pan et al.

Page 1 of 1

It is certified that error appears in the above-identified patent and that said Letters Patent is hereby corrected as shown below:

In the Claims

In Column 14, Line 52, in Claim 3, delete "e s" and insert --items-- therefor

In Column 15, Line 62, in Claim 16, delete "that;" and insert --that,-- therefor Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*